United States Patent

Okada

Patent Number: 5,903,791
Date of Patent: May 11, 1999

[54] MECHANISM FOR LOCKING AND UNLOCKING COVER OF CARTRIDGE COMPARTMENT

[75] Inventor: Hiroyuki Okada, Osaka, Japan

[73] Assignee: Minolta Co., Ltd., Osaka, Japan

[21] Appl. No.: 08/591,138

[22] Filed: Jan. 25, 1996

[30]   Foreign Application Priority Data

Jan. 26, 1995  [JP]  Japan .................................. 7-10486

[51] Int. Cl.$^6$ .................................................. G03B 17/02
[52] U.S. Cl. ............................................ 396/535; 396/543
[58] Field of Search .................... 354/288, 214; 396/535, 536, 543, 301, 539

[56]           References Cited

U.S. PATENT DOCUMENTS

| 3,791,168 | 2/1974 | Coyle et al. | 62/408 |
| 3,936,843 | 2/1976 | Kurei et al. | 354/51 |
| 3,956,757 | 5/1976 | Nomura et al. | 354/51 |
| 3,981,022 | 9/1976 | Iwashita et al. | 354/171 |
| 4,071,066 | 1/1978 | Schaeffer | 150/52 |
| 4,171,892 | 10/1979 | Kozuki et al. | 354/173 |
| 4,839,677 | 6/1989 | Hoshino et al. | 354/195.1 |
| 4,982,211 | 1/1991 | Suzuki | 354/173.1 |
| 5,204,715 | 4/1993 | Nakanishi et al. | 354/475 |
| 5,440,364 | 8/1995 | Takahashi | 354/173.1 |
| 5,481,325 | 1/1996 | Wada et al. | 354/173.1 |
| 5,497,212 | 3/1996 | Kawamura et al. | 354/21 |
| 5,500,705 | 3/1996 | Stephenson, III | 354/288 |
| 5,526,084 | 6/1996 | Kataoka et al. | 354/275 |

FOREIGN PATENT DOCUMENTS 61-127530  6/1986  Japan .

OTHER PUBLICATIONS

Olympus Superzoom 70 Instruction Manual. P. 8, Aug. 1993.
Olympus Superzoom 70 Instruction Manual. P. 12, Aug. 1993.

*Primary Examiner*—Safet Metjahic
*Assistant Examiner*—Christopher E. Mahoney
*Attorney, Agent, or Firm*—Sidley & Austin

[57]            ABSTRACT

A mechanism which makes it possible to unlock a cartridge compartment cover manually from a body of a camera, when an electric source is short of power, the cover of which is normally unlocked electrically therefrom. An opening is formed in a wall, forming the battery compartment, which is usually shut up from outside by a battery compartment cover that can be opened manually if necessary. One end of a locking nail, the other end of which locks/unlocks a cartridge compartment cover which is unlocked electrically from the camera body at normal use, extends inside the opening. When the battery is short of electric power, the cartridge compartment cover can be opened to take the cartridge out, by opening the battery compartment cover manually first, by taking the battery out of the battery compartment, and by operating the locking nail from inside of the battery compartment manually.

17 Claims, 8 Drawing Sheets

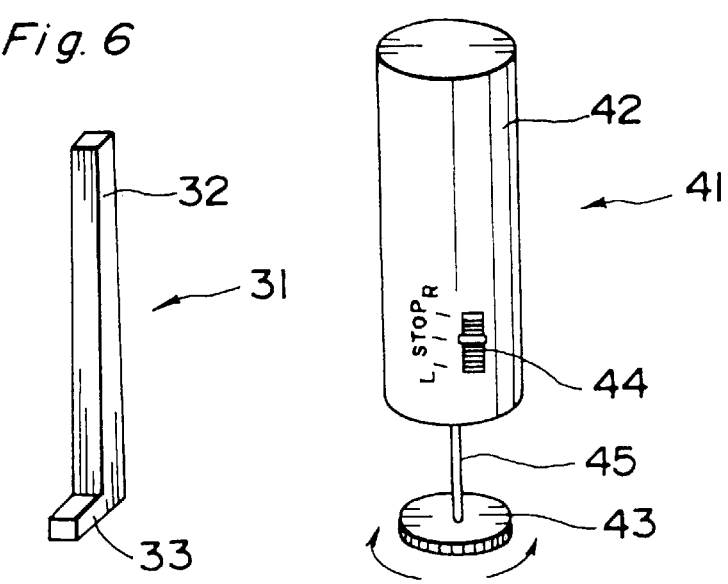
Fig. 6
Fig. 7
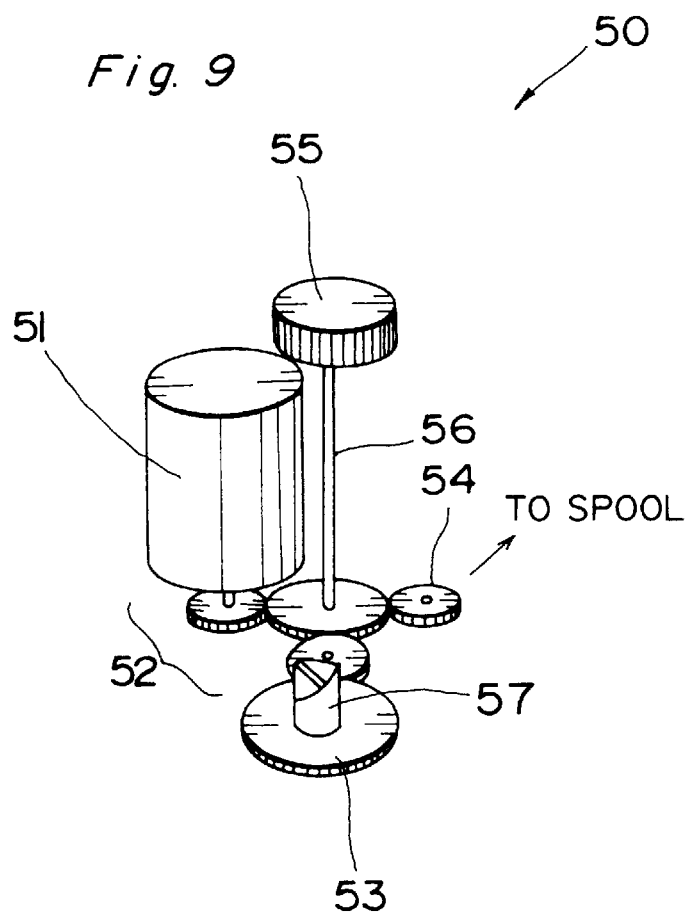
Fig. 9

MECHANISM FOR LOCKING AND UNLOCKING COVER OF CARTRIDGE COMPARTMENT

BACKGROUND OF THE INVENTION

1. Field of the Invention

The present invention generally relates to a film housing device which is provided with a mechanism for unlocking a cover of a cartridge compartment, and particularly relates to the unlocking mechanism, provided in a type of a camera in which the cover of the cartridge compartment is electrically unlocked from a body of the camera, which makes it possible to take the film out from the cartridge compartment when an electric source of the camera gets short of an electric power.

2. Description of the Related Art

Conventionally, such a type of a camera has been proposed as one in which a cover of a cartridge compartment keeps locked with respect to a body of the camera till all the frames of the film housed inside a film cartridge are exposed to light in photo-takings, and in which the cover of the cartridge compartment is electrically unlocked from the body, at time of taking the cartridge out from the cartridge compartment after all the frames thereof are exposed.

According to the mechanism of the camera, however, it is impossible to take the cartridge out from the cartridge compartment, when a battery as an electric source of the camera dies out.

If such a situation occurs after the film with all the frames of which are exposed to light is rewound inside the cartridge set inside the compartment, a user troublesomely must replace the old battery with a new one in order to unlock the cover of the cartridge compartment from the camera body for taking the film therefrom. In other words, the user can not take the film cartridge out from the cartridge compartment without the new battery.

Neither can the user take the film cartridge out therefrom without the new battery, if such a situation occurs as the battery wastes away to stop a film-rewinding mechanism of the camera before a completion of the film-rewinding operation.

SUMMARY OF THE INVENTION

Therefore, it is one object of the present invention to provide a film housing device provided in a type of a camera in which a cover of a cartridge compartment is electrically unlocked from a body of the camera, which makes it possible to unlock the cover therefrom manually, for taking the film cartridge out from the cartridge compartment, without replacing an old battery short of an electric power with a new one.

It is another object of the present invention to provide the film housing device which makes it possible to rewind the film inside the film cartridge manually, when the film-rewinding operation comes to stop due to a shortage of the electric power in the battery.

It is still another object of the present invention to provide an unlocking tool by which a user can unlock the cover from the camera body manually.

In accomplishing these and other objects of the present invention, there is provided a film housing device which accommodates a film cartridge, comprising: a first chamber which is loaded with the film cartridge; a first cover, for the first chamber, which is movable between a close position at which the first cover closes the first chamber and an open position at which the first cover opens the first chamber; a lock mechanism that locks the first cover at the close position, the lock mechanism having a movable member which moves between a locking position at which the first cover is locked at the close position and a releasing position at which the first cover is allowed to move from the close position to the open position, the movable member being able to be operated manually from the locking position to the releasing position; and an unlocking mechanism, driven by an electric power, which drives the movable member from the locking position to the releasing position in response to a release signal.

In the mechanism, for example, the first cover is always biased towards the open position by a biasing means, while the movable member is always biased towards the locking position by a biasing means.

With the mechanism, when the first cover is moved from the open position to the close position, the first cover is locked at the close position by the movable member at the locking position. When the unlocking mechanism is actuated by the electric power from a power source, the movable member is driven from the locking position to the releasing position and the first cover is driven from the close position to the open position by the action of the biasing means.

On the other hand, in case that the power source gets short of the electric power, for example, the unlocking mechanism may not be properly actuated electrically, thus not possible to drive the movable member from the locking position to the releasing position. However, under such a condition, by operating the movable member manually, the movable member is driven from the locking position to the releasing position, which in turn moves the first cover from the close position to the open position by the action of the biasing means. That is, even if the power source dies out, a user can take the film cartridge out from the first chamber, without replacing the old power source short of an electric power with a new one.

The film housing device may further comprise a frame member, covering the lock mechanism, which is provided with an aperture through which the movable member can be operated manually. More specifically, in order to operate the movable member manually, the user may use an unlocking tool which is manually accessible through the aperture to move the movable member from the locking position to the releasing position.

The film housing device may further comprise a second chamber, defined with a wall, in which the electric source such as an battery, a mirror, or the like is put, and the aperture may be formed in the wall. Furthermore, the film housing device may comprise a second cover, for the second chamber, which is movable between a close position at which the second cover closes the second chamber and an open position at which the second cover opens the second chamber, wherein the second cover is operated only manually.

According to the mechanism, because the aperture through which the movable member is operated manually is shut up from outside of the device, not only it is surely prevented that something like a trash steals in the aperture to unexpectedly drive the movable member from the locking position to the releasing position, but also there is no need of any specially additional construction to waterproof the aperture in case that the camera is of a waterproof type.

The film housing device may form a part of a reflex-type camera having a mirror which is housed in the second chamber.

More specifically, the mechanism may be constructed as follows: the movable member, being pivotally supported on a frame of the device, may have a metal piece at one end thereof relative to its pivot and a first locking part at the other end thereof relative thereto; the first cover may have a second locking part which is locked by the first locking part of the movable member when the first cover is moved to the close position from the open position; and the unlock mechanism may have a solenoid to magnetically attract the metal piece of the movable member to unlock the second locking part of the first cover from the first locking part of the movable member.

The film housing device may further comprise a feeding mechanism which feeds the film with respect to the film cartridge.

The film housing device may further comprise a detecting device for detecting whether the electric power supplied from the power source is higher than a predetermined level. In this mechanism, the predetermined level may be a level necessary for a proper exposure control, wherein the unlock mechanism operates even if the detecting device detects that the electric power is lower than the predetermined level.

In accomplishing the above objects of the present invention, there is also provided a film housing device which accommodates a film cartridge, comprising: a first chamber into which the film cartridge is put; and a feeding device for feeding the film in and out the film cartridge, wherein the feeding device having a first rewinding device, for rewinding the fed-out film into the film cartridge, which is driven by an electric power; and a second rewinding device, for rewinding the fed-out film into the film cartridge, which is driven by an operator's manual operation.

According to the mechanism, if the electric source is short of the electric power so that the first rewinding device is not driven, the film is rewound inside the film cartridge by driving the second rewinding device manually.

In the mechanism, the second rewinding device may have an aperture through which the operator is able to perform a film-rewinding operation. In the mechanism, the film housing device may comprise a second chamber into which a battery, for supplying the electric power to drive the first rewinding device, is put, wherein the aperture is provided in the second chamber.

According to the mechanism, because the aperture through which the operator can perform the film-rewinding operation manually is shut up from outside of the device, not only it is surely prevented that something like a trash steals in the aperture to spoil the feeding device, but also there is no need of any specially additional construction to waterproof the aperture in case that the camera is of a waterproof type.

In order to operate the second rewinding device, the operator's manual operation may be performed by a rewinding tool which is inserted through the aperture.

The film housing device may further comprise a cover for the first chamber, wherein the second rewinding device can be operated manually when the first chamber keeps closed.

With the mechanism, it is surely prevented that the film is carelessly exposed to light while the user tries to rewind the film inside the film cartridge manually.

The film housing device may form a part of a camera.

In accomplishing the above objects of the present invention, there is also provided a manually unlocking tool for unlocking a cover for a cartridge chamber of a camera having an unlocking mechanism, for unlocking the cover from a body of the camera, which is driven by an electric power, comprising: a holding part which is held by an operator; and an engaging part which engages with the unlocking mechanism, wherein the engaging part is accessible to the unlocking mechanism through an aperture which is other than the cartridge chamber.

In the mechanism, the tool may be detachably provided on the camera body.

BRIEF DESCRIPTION OF THE DRAWINGS

These and other objects and features of the present invention will become clear from the following description taken in conjunction with a preferred embodiment and modifications thereof with reference to the accompanying drawings, in which:

FIG. 6 is a general perspective view showing a first tool manually operated for opening the cartridge compartment cover of FIG. 3;

FIG. 7 is a general perspective view showing a second tool manually operated for rewinding a film inside the cartridge;

FIG. 9 is a perspective view showing a part of a film-feeding mechanism of the camera of FIG. 1;

DETAILED DESCRIPTION OF THE INVENTION

Figure 1:
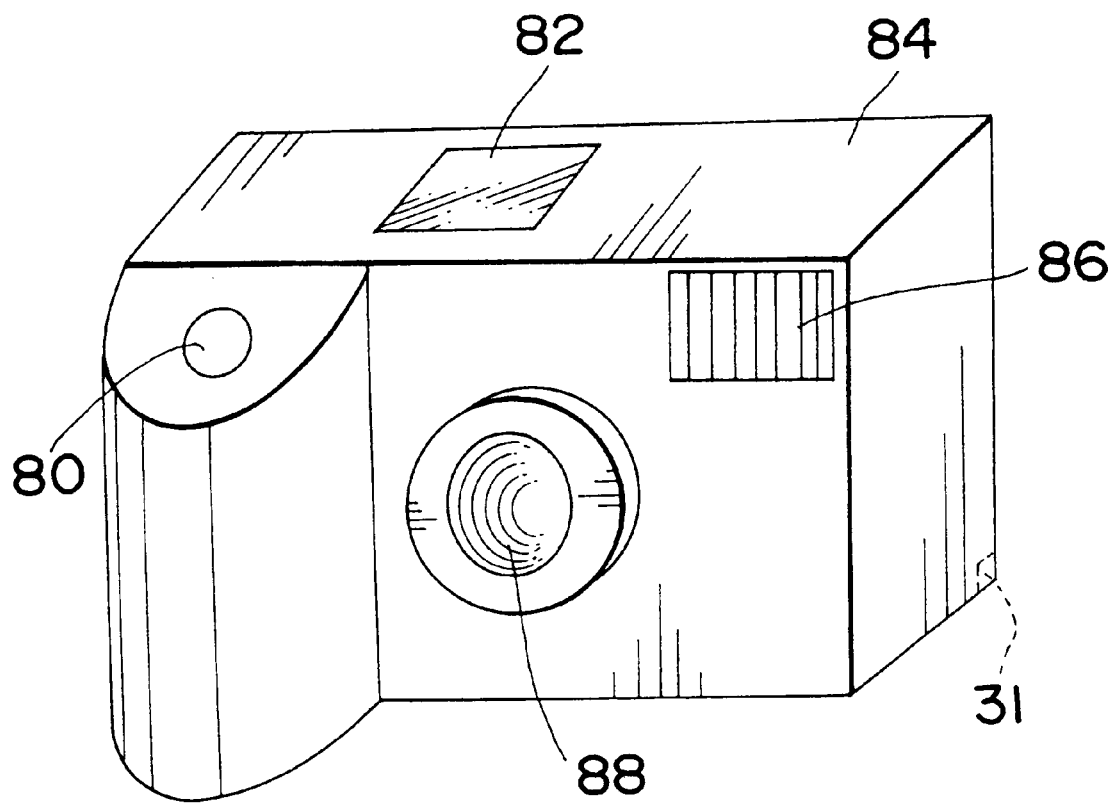
FIG. 1 is a general perspective view of a camera to which a film housing device according to the preferred embodiment of the present invention is applied.

Before the description of the present invention proceeds, it is to be noted that like parts are designated by like reference numerals throughout the accompanying drawings.

First, referring to FIGS. 1 through 10, a full description is made below on a camera to which a film housing device according to a preferred embodiment of the present invention is applied.

Figure 2:
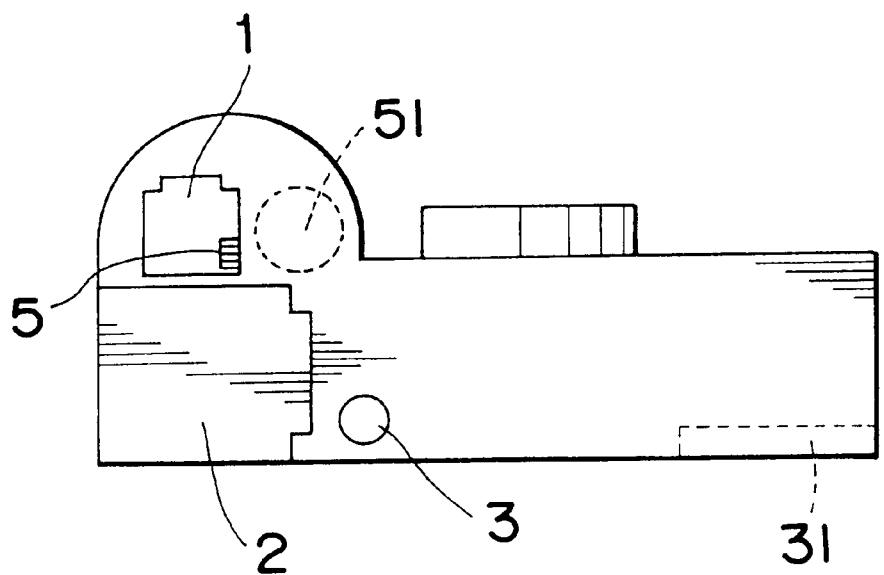
FIG. 2 is a bottom plan view of the camera shown in FIG. 1.
Figure 3:
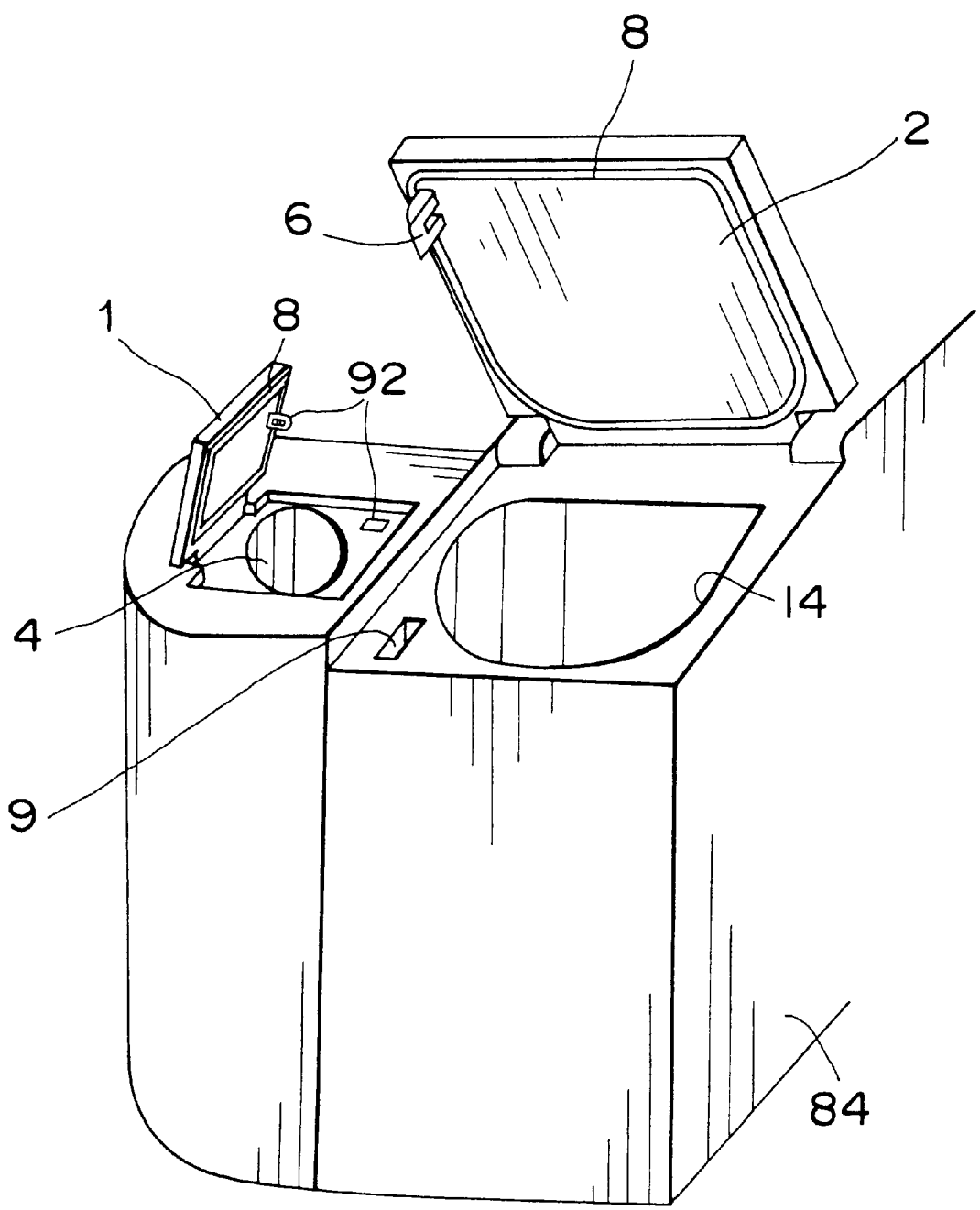
FIG. 3 is a partially enlarged, perspective view showing a cartridge compartment cover and a battery compartment cover of the camera of FIG. 2.

FIGS. 1 and 2 illustrate the camera shown from its front and its bottom side, respectively, and FIG. 3 illustrates a bottom part around a battery compartment cover and a cartridge compartment cover in enlargement of the camera of FIG. 1. In these figures, a reference numeral 84 points to a camera body; 4 to a battery compartment in which a battery is set; 14 to a cartridge compartment in which a film cartridge (not shown in the figure) is set; 1 to a battery compartment cover which opens and closes the battery compartment 4; 2 to the cartridge compartment cover which opens and closes the cartridge compartment 14; 88 to a photographing lens; 86 to a flash; 80 to a release button; and 82 to a display window. FIG. 3 illustrates that both the battery compartment cover 1 and the cartridge compartment cover 2 are open.

As shown in FIG. 2, the battery compartment cover 1 has a sliding member 5 which is manually, not electrically, operated to close and open the cover 1 with respect to the battery compartment 4. The sliding member 5 is associated with a locking system 92 as illustrated in FIG. 3.

The cartridge compartment cover 2 is biased towards an opening position thereof with a spring (not shown in the figure). In order to close the cartridge compartment cover 2 with respect to the cartridge compartment 14, a user rotates the cover 2 manually from the opening position to a closing position thereof, against the biasing force of the spring. The cartridge compartment cover 2 has a locking member 6 which projects towards the camera body 84.

Figure 4:
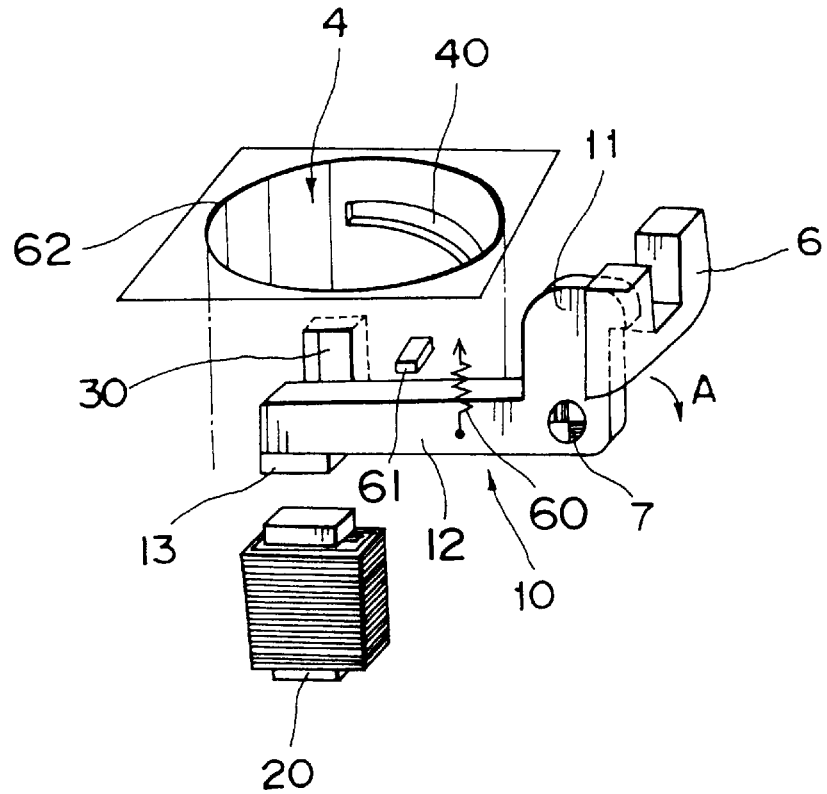
FIG. 4 is an explanatory view showing a locking mechanism, for locking the cartridge compartment cover with respect to a body of the camera, of the film housing device.
Figure 5:
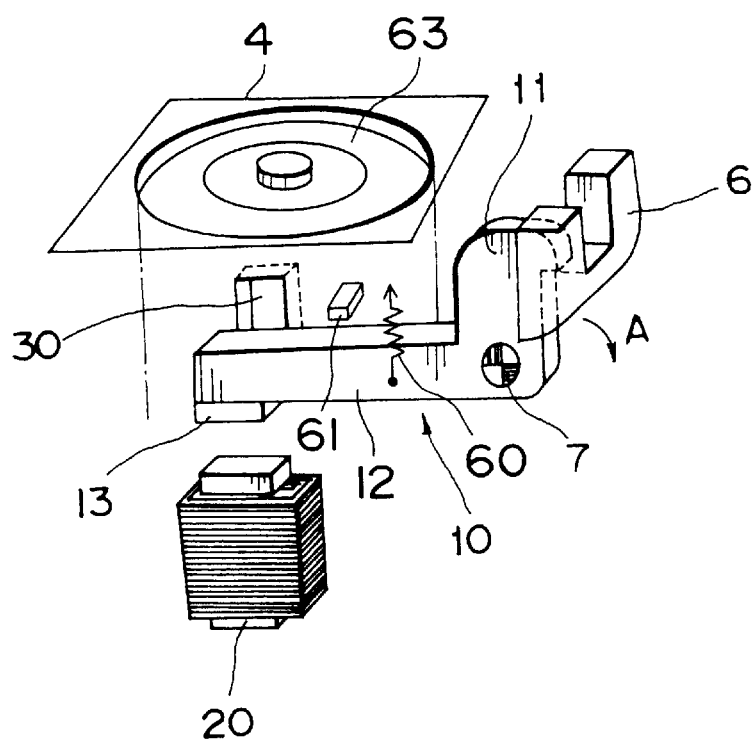
FIG. 5 is an explanatory view, similar to FIG. 4, showing that a battery is housed inside the battery compartment.

The locking mechanism for locking the cartridge compartment cover 2 with respect to the camera body 84 is illustrated in FIG. 4 explanatorily where only a battery compartment 4 is shown, but the cartridge compartment 14, the battery compartment cover 1 and the cartridge compartment cover 2 are not shown. The figure illustrates a condition in which the battery compartment 4 is not loaded with a battery, while FIG. 5 illustrates a condition illustrates in which the battery compartment 4 is loaded with the battery 63.

As shown in these figures, a locking nail 10 has an arm part 12, one end part of which extends up to a location adjacent to a side of the battery compartment 4. The locking nail 10 is rotatable about an axis 7, and the nail 10 is biased towards a locking position or in a direction denoted by "A" by a spring 60 in the figures.

With the mechanism, when the cartridge compartment cover 2 is opened, the arm part 12 of the locking nail 10 is stopped against a stopper 61.

On the other hand, when the cartridge compartment cover 2 is closed, the locking member 6 of the cartridge compartment cover 2 is inserted inside an insertion hole 9 made on the camera body 84, as shown in FIG. 3. Then, the locking member 6 is engaged with a nail projection 11 of the locking nail 10 to lock the cartridge compartment cover 2 with respect to the camera body 84 at the closing position.

FIG. 4 illustrates a condition in which the locking member 6 of the cartridge compartment cover 2 engages with the nail projection 11 of the locking nail 10. Under the condition, the cartridge compartment cover 2 is locked at the closing position with respect to the camera body 84.

The camera body 84 has an opening button 3 for opening the cartridge compartment cover 2, as shown in FIG. 2. In order to unlock the cartridge compartment cover 2 at the closing position from the camera body 84, the opening button 3 is pushed down manually. When the opening button 3 is pushed down, a cover switch, as explained later, is switched on, and a magnet 20 is energized or actuated to magnetically attract a metal piece 13 towards the magnet 20, the metal piece 13 being mounted on a lower surface of the arm part 12 of the locking nail 10. As a result, the locking nail 10 is rotated towards the unlocking position or in a direction opposite the direction designated by the arrow "A" in FIG. 4, so that the locking member 6 of the cartridge compartment cover 2 is unlocked from the nail projection 11 of the locking nail 10. As shown in FIG. 4, the metal piece 13 is disposed at one end relative to the axis 7 while the locking nail 11 is disposed at the other end relative to the axis 7.

The cartridge compartment cover 2 is, as mentioned above, biased towards the opening position by the spring; therefore, when the locking member 6 of the cartridge compartment cover 2 is unlocked from the nail projection 11 of the locking nail 10, the cartridge compartment cover 2 automatically rotates towards the opening position from the closing position.

As explained later, the camera is so constructed that only if the film (not shown in the figure) is rewound inside the film cartridge (not shown in the figure) housed in the cartridge compartment 14, the magnet 20 is energized to unlock the nail projection 11 of the locking nail 10 from the locking member 6 of the cartridge compartment cover 2 at time of pushing the opening button 3 down. Consequently, under a condition in which the film is not rewound inside the film cartridge housed in the cartridge compartment 14, even if the user carelessly pushes the opening button 3 down, the cartridge compartment cover 2 is not opened, thus the exposure of the film to light being surely prevented.

As described above, the cartridge compartment cover 2 is normally unlocked from the camera body 84 by the electrical actuation of the magnet 20. However, for example, even if the battery is short of its electric power and the magnet 20 is not properly actuated, the cartridge compartment cover 2 can also be unlocked from the camera body 84 manually, as follows.

That is, the end of the arm part 12 of the locking nail 10 extends up to the side of the battery compartment 4, as mentioned above. A part of the camera body forming the battery compartment 4 has a first opening 30 adjacent to the end of the arm part 12 of the locking nail 10, as shown in FIGS. 4 and 5. The first opening 30 is formed along a path in which the end of the arm part 12 moves when the arm part 12 is rotated between the locking position and the unlocking position.

Here, a first tool 31 as shown in FIG. 6, and a second tool 41 as shown in FIG. 7 are prepared, respectively, for the purpose of opening the cartridge compartment cover 2 if the battery 63 gets short of its electric power so that the magnet 20 is not actuated after all the film is rewound inside the film cartridge, or for the purpose of rewinding the film into the film cartridge under a situation that the film-rewinding operation comes to stop because of a shortage of the electric power of the battery or under a situation that any malfunction in the electric system and/or the film-feeding mechanism occurs during the film-rewinding operation.

More specifically explaining, if such a situation occurs as the cartridge compartment cover 2 cannot be unlocked electrically from the camera body 84, the battery compartment cover 1 is opened first. As mentioned above, the compartment cover 1 can be opened by the user's hand.

Next, the battery 63 is taken out from the battery compartment 4, and a tip part 33 of the first tool 31 is inserted into the battery compartment 4 and then through the first opening 30 from inside, with a holding part 32 of the tool 31 being gripped by the user's hand.

Next, the arm part 12 of the locking nail 10 is pushed down, by a lower surface of the tip part 33 of the tool 31, from the locking position to the unlocking position or the magnet 20.

By the sequent manual operation of the first tool 31 to the locking mechanism of the camera, the cartridge compartment cover 2 is opened, as is done by the magnet 20.

The first tool 31, as shown in FIGS. 1 and 2, is detachably provided in a predetermined position of the camera body 84. However, it goes without saying that the installment position of the first tool 31 is not limited to the camera body 84, and that the tool 31 may be provided in a lens cap (not shown) or a carrying strap for the camera.

According to the embodiment of the present invention, if the battery dies out when the rewinding of the film inside the film cartridge is completed with all the frames being exposed to light, it is possible to manually open the cartridge compartment cover 2 by using the first tool 31, as mention above. Accordingly, there is no need of exchanging batteries only for the purpose of taking the film cartridge out from the cartridge compartment 14, thus no occurrence of such an inconvenient situation as the user cannot take the film cartridge out until a new battery is gotten.

According to the embodiment, the first opening 30 is provided in the inner wall surface 62 to form the battery compartment 4, and the compartment 4 is usually closed by the battery compartment cover 1 under a normal use. In other words, the inside of the battery compartment 4 is normally shut up from the outside of the camera body 84. Furthermore, the first opening 30 is provided at a part of the inner wall surface where the first opening 30 is covered by the battery 63 when the battery compartment 4 is loaded with the battery 63, as shown in FIG. 5. Therefore, such a possibility is surely avoided as the cartridge compartment cover 2 is unexpectedly opened by something like a trash or dust stealing into the first opening 30, in case that the user has no intention to open the cartridge compartment cover 2 at all.

Furthermore, it is surely prevented that such a trash or dust steals into the first opening 30 to induce any malfunction of the camera.

In addition, by constructing the camera as a waterproof one as shown in FIG. 3, the battery compartment 4 is also waterproof, because the locking mechanism of the camera is constructed inside the camera body 84. Hence, the first opening 30 of the battery compartment 4 does not spoil the waterproof property of the camera body 84.

Also, there is no need of additionally waterproofing the camera body 84 for the first opening 30. As shown in FIG. 3, a pair of waterproof packings 8 are provided in the inner surface of both the cartridge compartment cover 2 and the battery compartment cover 1, respectively.

From one aspect of the present invention, it would be apparent that the location of the opening is not limited to the inner wall surface of the battery compartment 4. For example, the opening may be formed in a part of the camera body 84 at any location which is normally shut up from the outside of the camera body 84 and which is manually accessible if necessary. For example, such an opening may be provided in a wall of a mirror box of the camera, and in such a case, it is possible to make an access to the locking nail 10 from inside of the mirror box after the lens is removed manually from the camera body.

Figure 8:
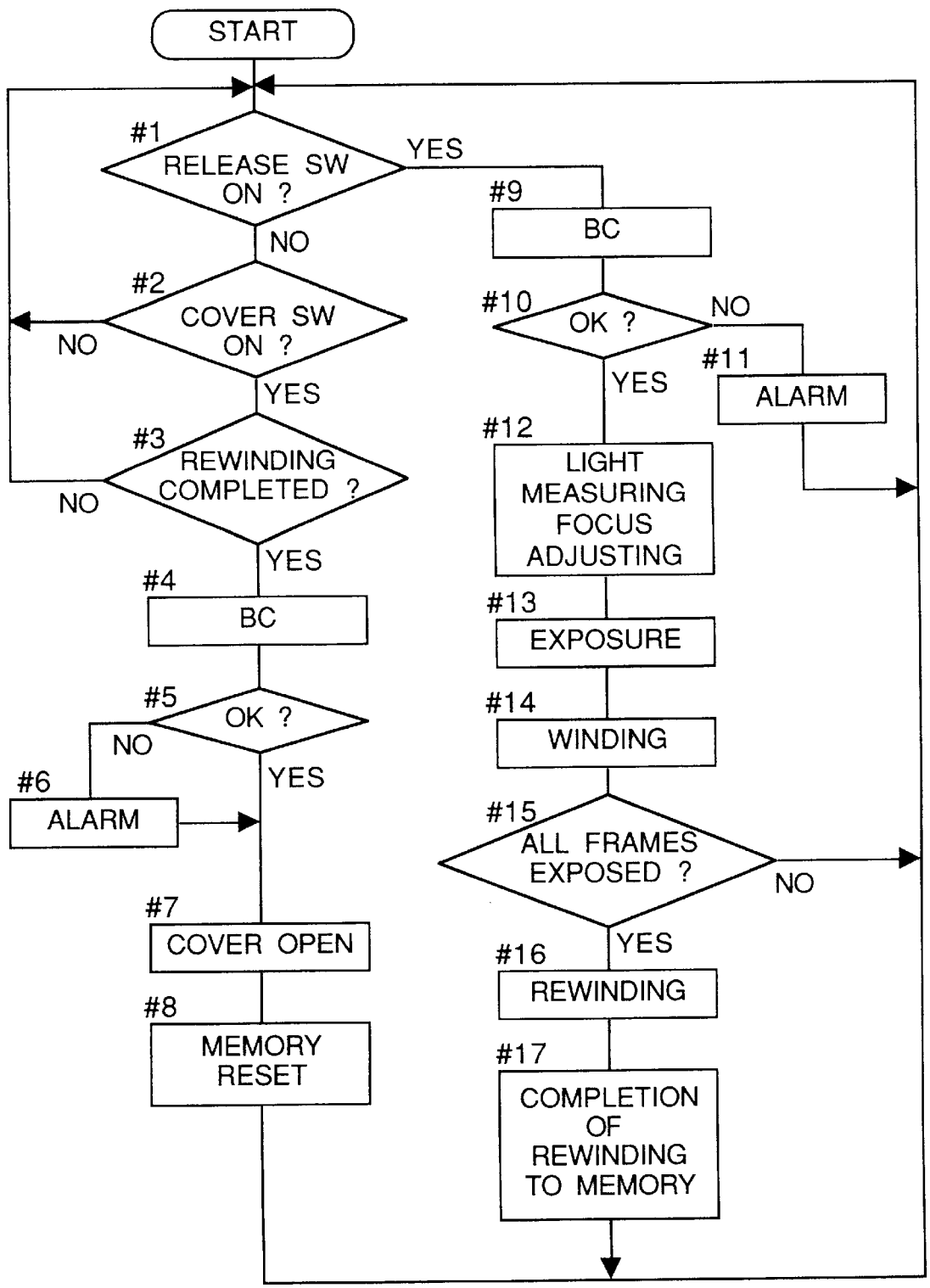
FIG. 8 is a flow chart showing a sequence of operation of the camera of FIG. 1.

Next, a description is made below on an operation of the camera, referring to the flow chart of FIG. 8.

The sequence shown in the figure starts, with the electric power of the camera being switched on.

First, it is detected at step #1 whether a release switch is turned on or not.

If the release switch is on, a battery checking is carried out at step #9 where it is detected whether the voltage of the battery is more than a predetermined voltage or not.

If the voltage of the battery is not more than the predetermined voltage, the program returns to the step #1 after an alarm is raised at step #11.

On the other hand, if it is detected at step #10 that the voltage of the battery is more than the predetermined voltage, light measurement and focus adjusting are performed at step #12, and then an operation to expose the film to light is performed at step #13.

Then, after an operation to wind the film up by one frame at step #14, it is detected at step #15 whether all the frames of the film are exposed or not.

If it is detected at step #15 that all the frames of the film are not exposed, the program returns to the step #1.

On the other hand, if it is detected at step #15 that all frames of the film are exposed to light, after an operation to rewind the film inside the film cartridge at step #16, an information that indicates the completion of the film rewinding operation is stored in a memory.

Meanwhile, if it is detected at step #1 that the release switch is not turned on, it is detected at step #2 whether the opening button 3 of the camera body 84 is pushed down or not; in other words, it is detected whether the cartridge compartment cover switch is turned on or not.

If it is detected at step #2 that the cartridge compartment cover switch is not turned on, then, the program returns to the step #1.

On the other hand, if it is detected at step #2 that the cartridge compartment cover switch is turned on, then, it is detected at step #3 whether the operation to rewind the film inside the film cartridge is completed or not, based upon the information stored in the memory.

If it is detected at step #3 that the film-rewinding operation is not completed, then, the program returns to the step #1, which means that the film cartridge compartment cover 2 is not opened.

On the other hand, if it is detected at step #3 that the film-rewinding operation is completed, after the program proceeds to step #4 at which the battery checking is made, it is detected at step #5 whether the voltage of the battery is more than a predetermined voltage or not.

If it is detected at step #5 that the voltage of the battery is more than the predetermined voltage, then, the magnet 20 is electrically actuated to open the cartridge compartment cover 2 at step #7.

On the other hand, if it is detected at step #5 that the voltage of the battery is not more than the predetermined voltage, then, after an alarm, for drawing attention that the battery should be replaced by a new one, is raised at step #6, the magnet 20 is electrically actuated to open the cartridge compartment cover 2 at step #7.

Then, the program proceeds to step #8 at which the memory is reset, and the program returns to the step #1.

According to the embodiment of the present invention, the voltage level in the battery checking is set to a predetermined voltage at which it is not possible to carry out a normal operation to expose the film to light. Even if the voltage of the battery is such a predetermined voltage, however, it is possible that the film, lens, etc. are fed, driven or actuated at a lower rate.

The magnet 20 is also operated, under such a condition in which the voltage of the battery reaches such a lower predetermined voltage. That is, even if it is detected at step #4 that the battery is short of voltage, the magnet 20 is so actuated that the cartridge compartment cover 2 is opened. But, of course, if the voltage of the battery is much lower than the voltage, the magnet 20 is not electrically actuated, so that it is not possible to open the cartridge compartment cover 2 by the action of the magnet 20. Under such a situation, the first tool 31 is used in order to open the cartridge compartment cover 2 manually at step #7, in accordance with the way explained above. Once the cartridge compartment cover 2 is opened, the program returns to the step #1, after the memory is reset at step #8 notwithstanding that the cover 2 is opened electrically or manually.

As mentioned above, the camera of the embodiment is so constructed that the cartridge compartment cover 2 can be opened manually even if the magnet 20 is not actuated electrically because of the lower voltage of the battery than the predetermined setting voltage, with all the film rewound inside the film cartridge.

Furthermore, according to the embodiment, even if a malfunction of the film-feeding mechanism under some reasons occurs, it is possible to rewind the film inside the film cartridge manually, as briefly stated above. Next, a detailed description is made below on the mechanism, referring to FIGS. 4, 7 and 9.

As shown in FIG. 4, the inner wall surface 62 forming the cartridge compartment 4 has a second opening 40 in a form of a slit extending in the inner peripheral direction, generally opposite the first opening 30. A gear 43 of the second tool 41 is inserted through the second opening 40 from inside of the battery compartment 4. The camera body is provided with a film-feeding mechanism 50 as shown in FIG. 9, and an aiding gear 55 of the film-feeding mechanism 50 is mounted, outside the battery compartment 4, at a location corresponding the second opening 40.

With the mechanism, when the gear 43 of the second tool 41 is inserted through the second opening 40, the gear 43 thereof is engaged with the aiding gear 55 of the film feeding mechanism 50.

The mechanism 50 is one for feeding the film as mentioned above, and it is the mechanism which has been conventionally used.

Here, briefly explaining the film feeding mechanism 50, 51 is a driving motor with a driving gear, the rotation of which is transmitted to a fork gear 53, to which a fork 57 is fixed, and/or a spool (not shown), through a system of gears 52. The aiding gear 55, which is provided adjacent the second opening 40 of the inner wall surface 62, is fixed to one of the gears 52 via a shaft 56. A gear 54 shown in the figure is an intermediate gear, one in the system of gears 52, which transmits the rotation to the spool.

With the mechanism, the film is normally fed with respect to the film cartridge under the operation of the driving motor 51. If a malfunction of the film feeding mechanism 50 occurs, the film feeding mechanism 50 can be forcibly operated manually, in order to rewind the film inside the film cartridge, by engaging the gear 43 of the second tool 41, illustrated in FIG. 7, with the aiding gear 55 of the system of gears 52.

That is, if a malfunction occurs of the film feeding mechanism 50, the electric system, etc. with the film not rewound inside the film cartridge, it is possible to rewind the film inside the film cartridge, by opening the battery compartment cover 1, by taking the battery 63 out from the battery compartment 4, by inserting the gear 43 of the second tool 41 into the battery compartment 4 and engaging the gear 43 with the aiding gear 55 of the system of gears 52 through the second opening 40 of the inner wall surface 63 of the battery compartment 4. Then, the user can take the film cartridge with some frames exposed to light from the cartridge compartment 14, by using the first tool 31 in order to open the cartridge compartment cover 2 manually.

According to the embodiment, if a malfunction occurs of the film-feeding mechanism 50 or the electric system, it is possible to rewind the film inside the film cartridge and take the cartridge out from the cartridge compartment 14 by the user's hands prior to disassembling the camera for repairs, thus no waste occurring of the film with some frames already exposed.

Furthermore, the second opening 40 is provided at a location of the inner wall surface 62 of the battery compartment 4 at which the second opening 40 is covered with the battery set inside the battery compartment 4, just like the first opening 30, the stealing of something like trashes into the second opening 40 is surely prevented.

Furthermore, since the second opening 40 is provided inside the camera body; more specifically speaking, since it is disposed at a location of a part of the camera body which is not exposed outside directly, the same effect of the waterproofing as the first opening 30 is realized, by constructing the camera waterproof.

Next, referring to the FIG. 7, it is explained about the construction of the second tool 41 more in detail.

The second tool 41 has the gear 43, a grip 42, and a shaft 45 which rotatably connects the gear 43 to the grip 42. As shown in the figure, the grip 42 has a switch 44 by which a rotational condition of the gear 43 relative to the grip 42 is selectively switched among the following three states: "STOP" at which the gear 43 and the shaft 45 are prohibited to rotate relative to the grip 42, "R" at which the gear 43 is possible to rotate only in a clockwise direction relative thereto, and "L" at which the gear 43 is possible to rotate only in a counterclockwise direction relative thereto. The user can select one of the three switching modes, and then makes the gear 43 engage the aiding gear 55 by holding the grip 42 of the second tool 41. Then, the film-feeding mechanism 50 is driven by rotating the grip 42 in a desired rotational direction, via the gear 43 and the aiding gear 55.

Although the second opening 40 forms in the inner wall surface 62 of the battery compartment 4 in the embodiment, the part which the second opening 40 forms in is not limited to the inner wall surface 62 thereof. For example, the second opening 40 may be provided in the wall of a mirror box, just like the first opening 30.

Figure 10:
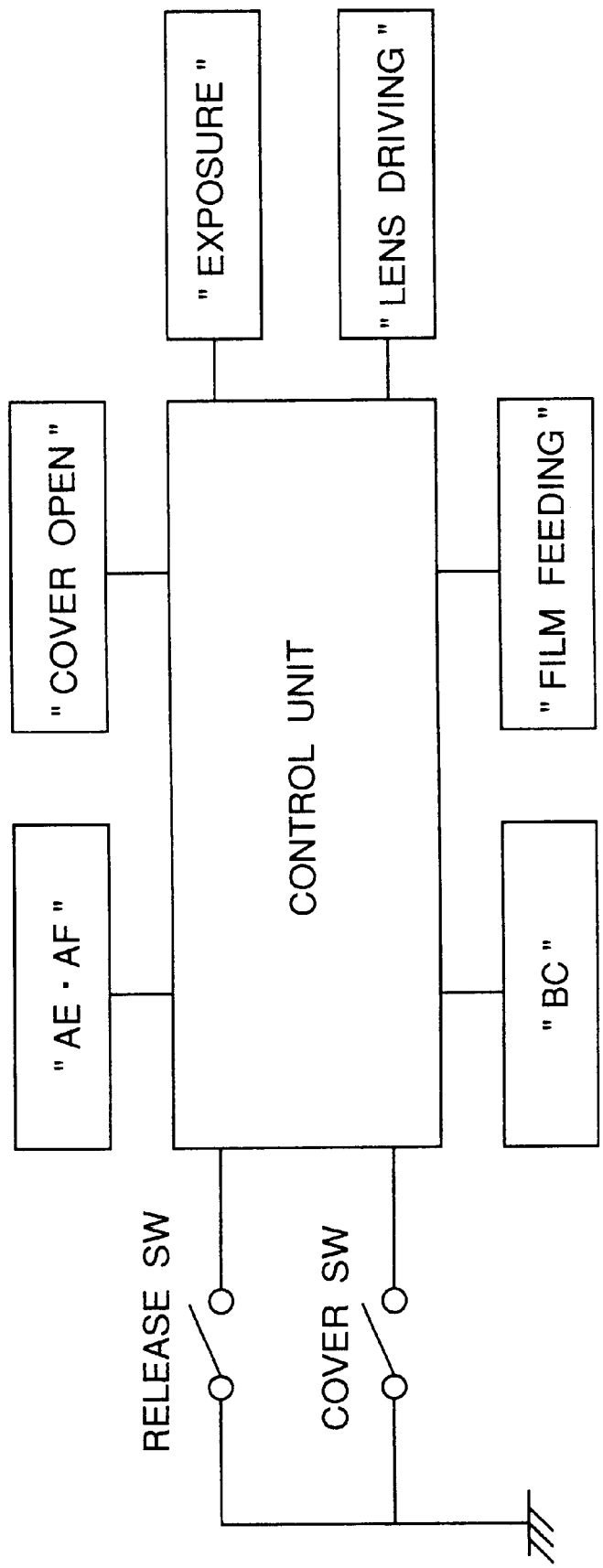
FIG. 10 is a block diagram, including a control unit, of the camera of FIG. 1.

Next, referring to FIG. 10, it is explained about a control unit or system of the camera.

FIG. 10 is a block diagram showing the control system of the camera. A "RELEASE SW" (release switch) is switched on when the release button 80 is pushed down. A "COVER SW" (cartridge compartment cover switch) is switched on when the opening button 3 is pushed down. A "AE" AF" designates an automatic exposure and focus unit which is associated with the "RELEASE SW". An "EXPOSURE" designates an exposure control unit for controlling an exposure of the film, based on the amount of light measured. A "LENS DRIVING" designates a lens driving unit for driving the lens to adjust the focus condition. The "AE" AF", "EXPOSURE", and "LENS DRIVING" are all associated with the "RELEASE SW". A "COVER OPEN" designates an unlocking unit, utilizing the magnet 20, for unlocking the cartridge compartment cover 2, which is associated with the "COVER OPEN". A "BC" designates a battery-checking unit which is associated with both the "RELEASE SW" and "COVER SW". A "FILM FEEDING" designates a film-feeding mechanism which is associated with the "RELEASE SW".

As mentioned above, if the "COVER OPEN" and/or "FILM FEEDING" unit(s) do(es) not function under some causes such as a shortage of electric power of the battery, the user can open the cartridge compartment cover and/or can rewind the film inside the film cartridge, manually.

Figure 11:
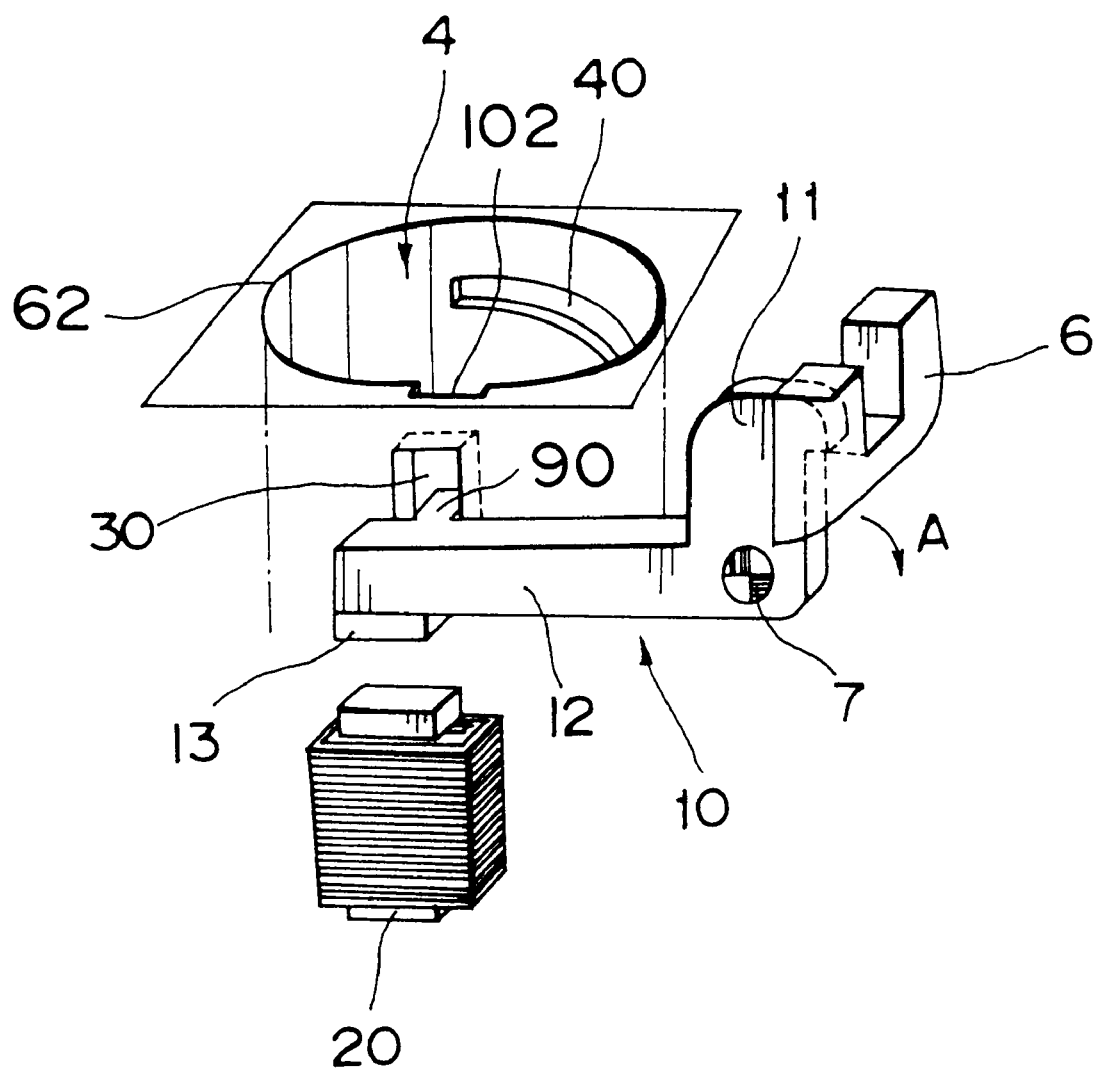
FIG. 11 is an explanatory view showing a locking mechanism, similar to FIG. 4, of a film housing device according to a first modification of the present invention.

In the embodiment, the camera is so constructed that it is possible to rewind the film inside the film cartridge and/or to open the cartridge compartment cover 2 by using the first tool 31 and/or the second tool 41. As a first modification to the device for housing the film, the camera may be so constructed that the cartridge compartment cover 2 can be opened manually without using such an aiding device. That is, the arm part 12 of the locking nail 10 is provided with a manipulation part, operated by the user's hand directly to drive the locking nail 10 between the locking position and the unlocking position, at a location corresponding to the first opening 30 of the inner wall surface 62 of the cartridge compartment 4, as shown in FIG. 11.

As shown in the figure, the arm part 12 of the locking nail 10 has a projection as the manipulating part 90 which projects from the end thereof towards the inside of the battery compartment 4 through the first opening 30. And, on the inside of the inner wall surface 62 along the first opening 30, there is provided a groove 102 within which a tip part of the manipulating part 90 of the locking nail 10 remains.

With this construction, the user can directly operate the manipulating part 90 of the locking nail 10 from inside of the battery compartment 4 in order to unlock the cartridge compartment cover 2 from the camera body 84.

Furthermore, not only an outer surface of the battery to be set inside the battery compartment 4 does not interfere the manipulation part 90 of the locking nail 10, but also the user can operate the manipulation part 90 thereof by his/her finger without employing a particular tool like the first or second tool mentioned above, with the battery compartment being not loaded with the battery.

According to the embodiment and the first modification, the opening through which the tool or the manipulation part of the locking nail is inserted is formed in the inner wall surface 62 of the battery compartment or a field which is usually closed or shut up from outside at normal use. However, the location of the opening is not limited to the ones shown in the above embodiment and the first modification, as far as such an opening is formed at any location where no one carelessly operates the locking nail 10.

Figure 12:
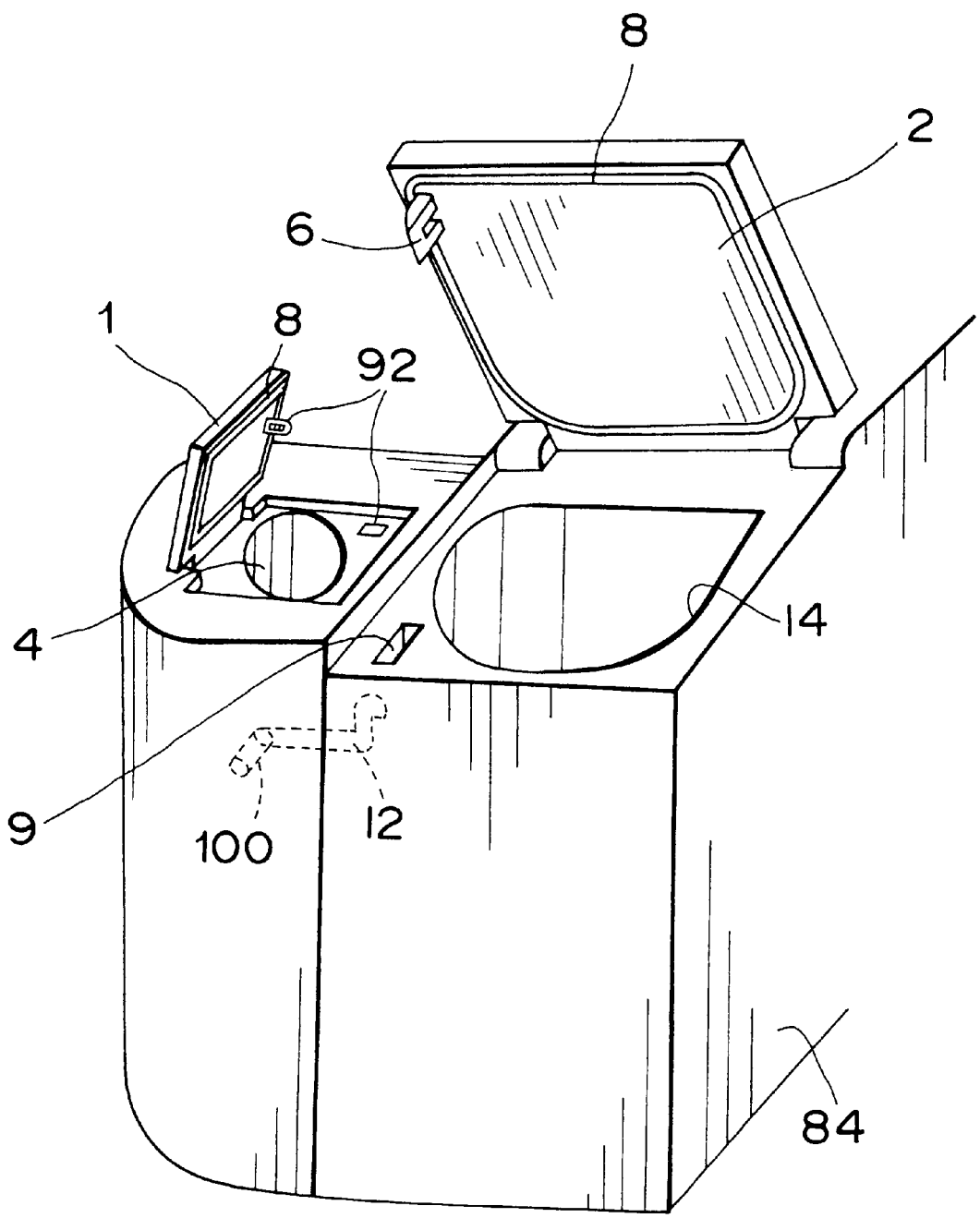
FIG. 12 is a partially enlarged, perspective view showing a cartridge compartment cover and a battery compartment cover, similar to FIG. 3, of a film housing device according to a second modification of the present invention.

Next, such an example is explained more in detail as a second modification to the device for housing the film, referring to FIG. 12.

As shown in the figure, the camera body has a small, penetrating hole 100 adjacent to the end of the arm part 12 of the locking nail 10. In order to unlock the cartridge compartment cover 2 from the camera body 84, the user inserts a needle-like member through the penetrating hole 100 to drive the arm part 12 of the locking nail 10 from the locking position to the unlocking position.

According to the second modification, the penetrating hole 100 is formed as a very narrow and small hole. Therefore, it is less possible that something like a trash jumps into the hole 100 to drive the locking nail 10, when the user has no intention to open the cartridge compartment cover 2.

In all the embodiment and modifications, the film housing device is applied to a camera. However, the apparatus to which the film housing device is applied, is not limited to the camera. For example, the film housing device may be applied to a film scanner in which an image of a film, housed therein, is converted into an electrical signal.

Although the present invention has been fully described in connection with the preferred embodiment and modifications thereof with reference to the accompanying drawings, it is to be noted that various changes and other modifications are apparent to those skilled in the art. Such changes and modifications are to be understood as included within the scope of the present invention as defined by the appended claims unless they depart therefrom.

What is claimed is:

1. A film housing device which accommodates a film cartridge, comprising:

a first chamber adapted to receive a film cartridge;

a first cover, for the first chamber, which is movable between a closed position and an open position;

an aperture communicating to internal portions of the housing;

a lock mechanism that locks the first cover at the closed position, the lock mechanism having a movable member which moves between a locking position at which the first cover is locked at the closed position and a releasing position at which the first cover is allowed to move from the close position to the open position, the movable member being accessible through said aperture so as to be operated manually from the locking position to the releasing position; and an unlocking mechanism, driven by an electric power, which drives the movable member from the locking position to the releasing position in response to a release signal.

2. The film housing device as claimed in claim 1, wherein an unlocking tool to manually move the movable member from the locking position to the releasing position is accessible through the aperture.

3. The film housing device as claimed in claim 1, further comprising:

a second chamber having an opening to the outside and defining the aperture.

4. The film housing device as claimed in claim 3, wherein an unlocking tool to manually move the movable member from the locking position to the releasing position is accessible through the aperture.

5. The film housing device as claimed in claim 3 further comprising:

a second cover, for the second chamber, which is movable between a closed position and an open position wherein the second cover is operated only manually.

6. The film housing device as claimed in claim 3, wherein the electric power is supplied from a battery with which the second chamber is loaded.

7. The film housing device as claimed in claim 3, which forms a part of a reflex-type camera having a mirror which is housed in the second chamber.

8. The film housing device as claimed in claim 1, wherein the movable member, being pivotally supported on a frame of the device, having a metal piece at one end thereof relative to its pivot and a first locking part at the other end thereof relative thereto, the first cover having a second locking part which is locked by the first locking part of the movable member when the first cover is moved to the close position from the open position, the unlock mechanism having a solenoid to magnetically attract the metal piece of the movable member to unlock the second locking part of the first cover from the first locking part of the movable member.

9. The film housing device as claimed in claim 1, further comprising:
   a feeding mechanism which feeds the film with respect to the film cartridge; and
   a frame member, covering the feeding mechanism, which is provided with an aperture through which a rewinding tool to manually rewind the fed-out film inside the film cartridge is inserted.

10. The film housing device as claimed in claim 1, which forms a part of a camera.

11. The film housing device as claimed in claim 10, further comprising a detecting device for detecting whether the electric power is higher than a predetermined level.

12. The film housing device as claimed in claim 11, wherein the predetermined level is a level necessary for a proper exposure control, wherein the unlock mechanism operates even if the detecting device detects that the electric power is lower than the predetermined level.

13. The film housing device as claimed in claim 1, further comprising:
   a second cover, for said internal portions of the housing, which is movable between a closed position and an open position wherein the second cover is operated only manually.

14. The device of claim 13 wherein said second cover is a removable lens.

15. The device of claim 13 further comprising a first seal for providing a watertight seal between said first cover and said first chamber when said first cover is in the closed position and a second seal between said second cover and said second chamber for providing a watertight seal when said second cover is closed.

16. The film housing device as claimed in claim 1, further comprising:
   a feeding mechanism for feeding the film from a film cartridge; and
   a frame member, covering said feeding mechanism, defining an aperture through which a rewinding tool to manually rewind the fed-out film inside the film cartridge can be inserted.

17. The film housing device as claimed in claim 1, which forms a part of a camera.

\* \* \* \* \*